United States Patent Office 3,354,700
Patented Nov. 28, 1967

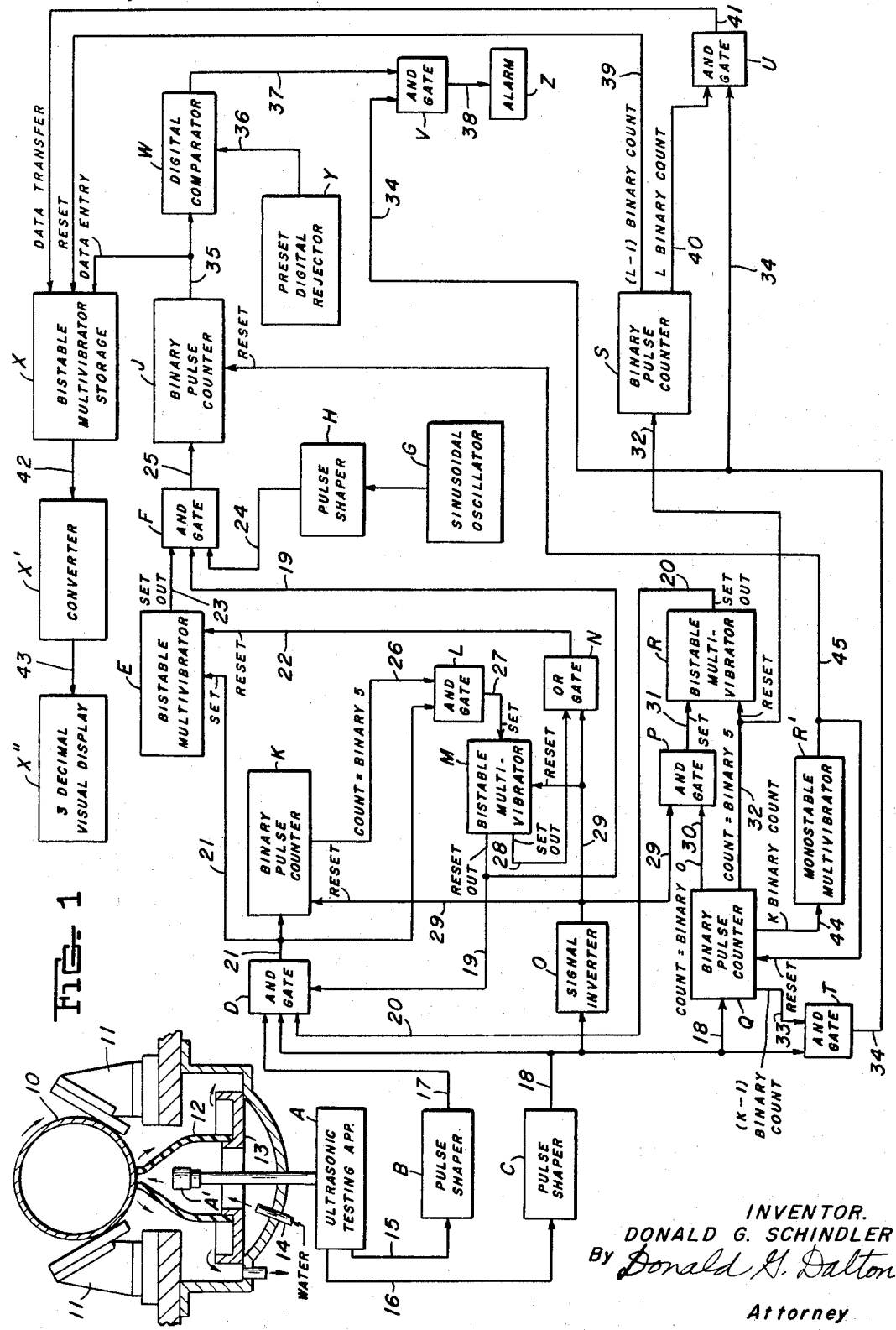

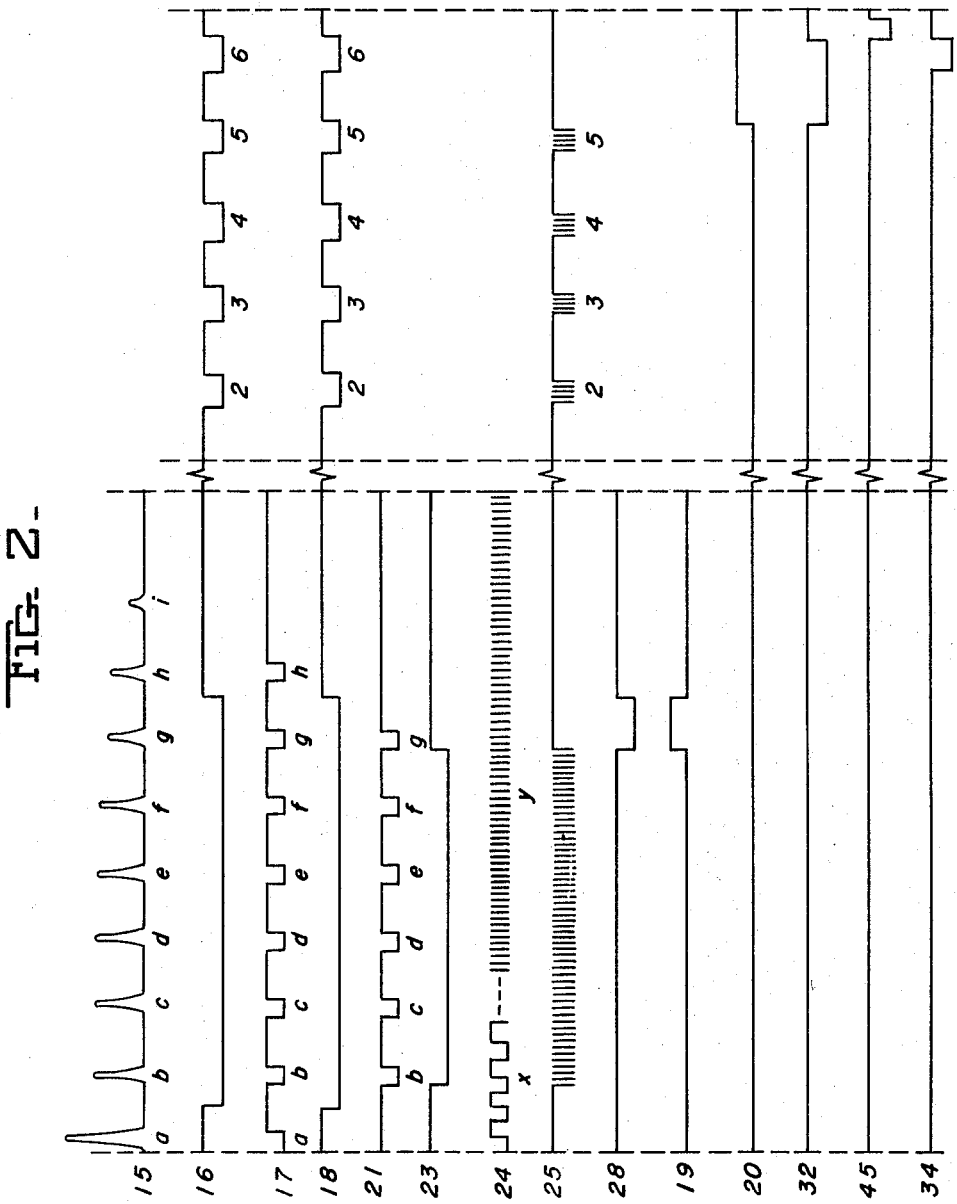

3,354,700
APPARATUS FOR MEASURING THICKNESS OF MATERIALS BY SOUND-WAVE REFLECTION
Donald G. Schindler, Whitehall, Pa., assignor to United States Steel Corporation, a corporation of Delaware
Filed July 2, 1964, Ser. No. 379,861
6 Claims. (Cl. 73—67.9)

This invention relates to apparatus for automatically and continuously measuring, from one side only, the thickness of a moving tube, sheet, strip and the like by timing reflections from pulses of ultrasonic waves.

The principal object of the present invention is to provide new and improved apparatus for automatically and continuously measuring and indicating the thickness of materials capable of supporting ultrasonic waves.

More specifically, the principal object of the present invention is to provide apparatus for measuring the thickness of material capable of supporting ultrasonic waves, comprising means for introducing successive pulses of ultrasonic waves through one surface of the material and delivering a signal on the arrival of an echo of each pulse reflected from the other surface.

A further object is to provide apparatus comprising means for generating a timing-frequency wave and means for counting the number of cycles along said wave occurring during the time span of a predetermined number of pulses and reflected echoes.

Still a further object of invention is to provide apparatus constituting a gage which digitally accumulates and displays a number equal to the absolute thickness value of a material as determined from a measurement of the required time for a certain number of repeated ultrasonic back-surface reflection echoes to be received from the material.

It is yet another object of the invention to provide apparatus which will digitally compare the absolute value of the thickness of a material against known and preset tolerance limits, automatically alarm for thickness outside these limits and visually indicate the absolute thickness values in decimal form at a sampling rate consistent with visual observation.

A still further object is to provide a thickness gage which is linear over its entire operating range whereby a single calibration on a known thickness sample will suffice for any thickness of that same material where the preferred number of reflection echoes are maintained.

Briefly stated, the thickness measuring apparatus of my invention utilizes conventional ultrasonic testing apparatus which generates electrical signals from pulses introduced through one side of the material and reflected from the other. I measure the time required for a predetermined number of reflections or echoes to derive the thickness of a material. The conventional ultrasonic testing apparatus comprises an electrical pulser means for exciting an ultrasonic transducer which converts the electrical pulses into ultrasound and, during reception intervals between pulser signals, converts the returned plurality of echoes of ultrasound from the material into electrical signals. The electrical signals or waves to be used are those separated in time during a reception interval by the time required for the ultrasound to traverse twice the material thickness at the speed of sound unique to the material. The time between a certain number of signals within a single reception interval and cumulatively added for a plurality of successive reception intervals is converted into a digital measure of the thickness of the material as an absolute value of the thickness. This measure is usable by other mean to indicate an outside tolerance value for the thickness and for visually indicating the thickness measured at selected time intervals.

The apparatus comprises first and second gate or coincidence circuits, each of which includes signal input portions and signal output portions, two counting means for generating control circuit inputs to the gate circuits and a third counting means for accumulating the absolute thickness measure. The gate circuits are normally inoperative to translate electrical signals between their input and output circuit portions, but each is adapted to be operatively conditioned by control circuit inputs to them. A replica of the electrical signals originating within the ultrasonic testing apparatus, representing returned echo ultrasound from the material, is supplied to the input of the first gate circuit. The ultrasonic testing apparatus also provides control pulses or signals in synchronism with the electrical pulser signals it transmits. This first control signal is also applied to the first gate circuit. Means including a first counting means also receives this first control signal and generates a second control signal that exists during a first reception interval and is applied to the first gate circuit. Means including a second counting means also receives this first control signal and generates a third control signal that exists for several, for example, five, successive reception intervals, for application also to the first gate circuit.

Its input signal requirements satisfied, the first gate circuit generates an electrical output or signal for application to the second gate circuit. The first counting means also receives the output of this first gate circuit. As described above, the first counting means with other means generates a second control signal. This signal is also applied to the second gate circuit during that part of a single reception interval between, for example, the first and the sixth thickness echo pulse coming from the material being gaged, as converted into electrical signals by the ultrasonic testing apparatus. The second gate circuit also has as an input a continuous, uniformly-timed, independent electrical signal originating from a stable, sinusoidal oscillator. The frequency of this oscillator may be varied from, for example, 1 to 10 megacycles per second depending on the kind of material being gaged. During a reception interval represented by the conjunction or coincidence of the above-described two signals, a replica of the oscillator signal is permitted entry into a third counting means for accumulating a measure of time as indicative of the thickness of the material. This measure is cumulatively added for a total of five such sucessive reception intervals, for example, and thereby an absolute thickness value for the material is obtained with a high degree of accuracy. The electrical signals representing a thickness value stored in the third counting means may be utilized to indicate visually the thickness of the material being gaged and to be compared with a preset digital tolerance value of the material for alarm purposes. At the conclusion of the fifth reception interval, additional timer means generate signals that return the above-described control circuits and counting means to their initial or quiescent state to begin a new measuring cycle.

The present invention, both as to the arrangement of the apparatus and manner of operation may best be understood by reference to the following description taken in connection with the accompanying drawings, in which:

FIGURE 1 is a schematic diagram, partly in block form, of apparatus and circuitry embodying the present invention; and FIGURE 2 illustrates a series of wave forms or signals drawn to a common time scale in which the numbers in the left margin represent particular wave forms which appear during a first selected time interval at circuit portions of the apparatus of FIGURE 1 and are designated by the same numbers. The righthand portion, also drawn to a common, but longer time scale, represents wave forms which are repeated or appear during a second and successive selected time intervals. Only a few of the repeated wave forms have been selected for illustration.

Referring now to FIGURES 1 and 2, there is shown in FIGURE 1 a pipe 10 supported on V-block supports 11 and rotatable about its own axis by skewed rolls (not shown) which move the pipe axially, as well as rotating it. A flexible nozzle 12 extends upwardly from a bowl 13. The upper opening of nozzle 12 is in close proximity to the pipe. A nozzle 14 supplies the bowl with water which is discharged through the flexible nozzle, forming an immersing medium in contact with the pipe length. A scanner assembly comprising ultrasonic testing apparatus A, including a transucer A', intermittently introduces ultrasonic vibrations radially into the pipe wall through the water. The material to be tested may be moving flat material, such as sheet or strip, as well as tubular material. The scanner assembly may be moved with respect to stationary material.

The ultrasonic testing apparatus A is conventional and may a Type UM–700 "Reflectoscope" manufactured by Sperry Products Co. From the ultrasonic testing apparatus electrical signals 15 and 16 are obtained as explained above.

As shown in FIGURE 2, signal 15 comprises a voltage pulse derived from an ultrasonic excitation pulse 15a, a front surface or interface echo voltage pulse 15b and thickness or back inside surface reflection or echo voltage pulses 15c, 15d, 15e, 15f, etc. As an example, six ultrasonic reflection voltage pulses 15b–15g inclusive have been chosen for discussion. In order to measure the time interval between the beginning or leading edge of voltage pulse 15b and the leading edge of voltage pulse 15g, a first control signal 16 is derived from the ultrasonic testing apparatus A. Signal 16 is a gate pulse of rectangular shape that begins after the ultrasonic excitation pulse 15a is transmitted and exists for a predetermined time period during which ultrasonic reflection voltage pulses 15b–15g inclusive occurs.

Signals 15 and 16 are shaped and converted to the proper voltage levels in shapers B and C, respectively. Shapers B and C are conventional electronic modular circuits and may be of a Type ST–35, S–PAC Module, manufactured by Computer Control Co. Shapers are also known as Schmitt trigger circuits and as such accept a low voltage input signal and through amplification means abruptly switch to a predetermined voltage level as long as the input voltage is above the preset low voltage or trigger level. When the input signal falls below the trigger level, the output voltage abruptly switches to its initial or quiescent state.

The respective output signals 17 and 18 from shapers B and C are coupled to a coincidence circuit or AND gate D. This gate is a conventional electronic modular circuit that performs the logical AND function on electrical signals. That is, for the period of time when all the required inputs, for example, input 1 AND input 2 AND input 3, etc., are in an electrically defined signal state, the circuit will have an electrical signal output. When any or all inputs are in a no-signal state, the output reverts to a no-signal state also. Gates are used for gating or time-sequencing electrical events within the thickness gage. Gate D may be assembled from units such as Type DN35, DN20, S–PAC Modules manufactured by Computer Control Co.

Initially we can assume the presence of a second control signal 19 and a third control signal 20, the generation of which include first and second counting means respectively, will be expained in detail hereinafter. With signals 19 and 20 present and signals 17 and 18 also present, the input requirements for AND gate D are satisfied. Hence, an ouput signal 21 of AND gate D exists as a replica of signal 17, during that part of a reception interval in which signals 18, 19 and 20 also exist.

When the leading edge of the first pulse 21b occurs it sets a bistable multivibrator E into an output condition. Multivibrator E is a circuit wherein the leading edge of the first input pulse 21b of the series of pulses 21 when applied to its "set" input cause the multivibrator to assume a signal condition at its output and to remain in this state. When a signal 22 is applied to its "reset" input, multivibrator E reverts to a no-signal output condition. The generation of signal 22 will be described hereinafter. A multivibrator E may be of a Type FF–30 S-PAC-Module manufactured by Computer Control Co.

Output signal 23 from the multivibrator E is one of the signals necessary to put an AND gate F into an operative condition. Signal 19 is a second signal applied to the input to AND gate F. An oscillator G in conjunction with a pulse shaper H, present rapid and alternate signal, no-signal, conditions as an output signal 24. In FIGURE 2 the signal or wave shape is shown as 24x. However, 24y better illustrates its greater frequency with respect to such signals as 21b, 21c etc. This signal is the third input signal to AND gate F. Oscillator G is a free-running sinusoidal, voltage oscillator, of high stability. The frequency of this oscillator may be varied from 1 to 10 megacycles per second. Such a unit is a Type 1211-C manufactured by General Radio Co.

With the presence of signals 19, 23 and 24, the input requirements of AND gate F are satisfied. Hence, an output signal 25 of AND gate F exists as a replica of signal 24, during that part of a reception interval in which signals 19 and 23 exist. Output signal 25 is applied to a binary pulse counter J. Thus, counter J counts the cycles of oscillation of oscillator G, beginning from its initial binary zero (0) count state. In the above introductory description counter J is designated as the third counter.

A binary pulse counter comprises a series of high speed, bistable multivibrators, more conventionally known as flip-flop circuits, operating in a binary counting mode. This form of a bistable multivibrator circuit accepts a series of electrical pulse inputs and generates an output that changes state from signal (no signal) to no signal (signal) at each pulse of the input series. A tandem connection of such circuits is made to count in a binary fashion or mode by the propagation of these output signal changes from one bistable multivibrator to another. A binary pulse counter can be assembled from Type BC–35–S–PAC modules manufactured by Computer Control Co.

Thus far, during the time beginning with the leading edge of the first pulse b of the series 21b–21g inclusive, signal conditions have been established which permit counter J to start counting the cycles of oscillation of oscillator G as a measure of time for a selected number of echo pulses to be propagated from the test material and thus to begin to accumulate a digital representation of the thickness of the material. As described hereinabove, when the trailing edge of the first pulse 21b occurs, a first binary pulse counter K is set into the binary 1 count state. Pulse counter J continues to count the cycles of oscillation of oscillator G, while the trailing edges of subsequent thickness echo pulses 21c–21f inclusive are counted in counter K during this single reception interval. The trailing edge of the fifth echo pulse 21f sets counter K in the binary 5 count state. The output signal status of the bistable multivibrators, comprising counter K, are electrically recognized through a multiplicity of AND gates therein (not shown), as being uniquely representative of the binary 5 count. This recognition constitutes an electrical signal output 26 for application as an input to an AND gate L. When the sixth pulse 21g occurs and is also applied as an input to AND gate L, and before counter K can respond to this pulse by counting the trailing edge thereof, the leading edge of the sixth pulse 21g and the binary 5 state output of counter K satisfy the input requirements of AND gate L. Hence, output signal 27 occurs and is applied as a "set" input to a bistable multivibrator M. This will effect three signal outputs therefrom. Firstly, its "reset" output as signal 19 reverts to a no-signal condition and thus removes one of the input signal requirements for AND gate D. Hence, gate D will not transmit a seventh thickness signal 21h. Secondly, the disappearance of signal 19 also removes one of the input signal requirements for AND gate F. Hence, signal 25 ceases. Thus counter J ceases counting the oscillations of oscillator G. Thirdly, bistable multivibrator M has a second output 28 which is a phase inversion of signal 19 and thus assumes a signal condition for application to an OR gate N. This is a conventional electronic modular circuit that performs the logical OR function on electrical signals. That is, for the period of time when any one of the inputs, for example, input 1, OR input 2, OR input 3, etc., are in an electrically defined signal state, the circuit will have an electrical signal output. When none of the inputs are in a signal state, the output is also in a no-signal state. Gate N may be assembled from units such as Type DN-35, DN-20 and S-PAC modules manufactured by Computer Control Co.

"Set" output signal 28 of multivibrator M is applied as an input to OR gate N. Hence, an output signal 22 previously defined as a "reset" input, is applied to multivibrator E. Hence, multivibrator E reverts to a no-signal output state. Signal 23 ceases, inhibiting pulse counter J from counting until the next reception interval.

First control signal 18 which occurs once per reception period between each ultrasonic energy pulse into pipe 10 is also applied as an input to a signal inverter O. An inverter is a circuit whose output signal is the inversion or negation of the input signal in that, when an input signal is applied, no output signal results but when no input signal is applied, an output signal exists. The circuit may comprise units Type DN-35, DN-20 and S-PAC modules manufactured by Computer Control Co.

When signal 18 ceases or reverts to the no-signal state after the end of the time measurement period between the leading edges of 21b–21g inclusive, the inverter O has an output signal 29 that will be applied as an input to four electronic blocks; namely, pulse counter K, bistable multivibrator M, OR gate N and an AND gate P.

Firstly, as to counter K, signal 29 is applied to the "reset" input and thus resets counter K to the zero (0) binary count state, in preparation for the next counting cycle which is initiated during the next reception interval. Secondly, signal 29 is applied to the "reset" input to multivibrator M, thus causing the "set" output signal 28 to disappear and the "reset" output signal 19 to reappear, the presence of this signal having been previously assumed. Thirdly, signal 29 is applied to OR gate N to insure the continued existence of "reset" input signal 22 between reception intervals, thus preventing any counting in counter J, as explained above. Fourthly, signal 29 is applied as an input to AND gate P.

The trailing edge of signal 18 which occurs once per reception interval between each ultrasonic energy pulse into pipe 10 is also counted in a second binary counter Q. Assume that counter Q is in a binary zero (0) state and that its corresponding output, to an input signal 18, is applied as an output signal 30 to AND gate P. When this zero state, the occurrence of which will be described hereinafter, coincides with signal 29 from inverter O, the input requirements of AND gate P are satisfied. Thus an output signal 31 results, which is applied as a "set" input to a bistable multivibrator R. Thus, its output signal 20 will appear, the presence of which was previously assumed.

The trailing edge of the first signal 18 after counter Q has been reset to the zero binary count is caused to enter and to register in pulse counter Q, a count of binary 1. One part of a measuring cycle has been completed here in that the first five successive time periods from signal 21b to signal 21g inclusive have been digitally measured in counter J.

That the count stored in J during this interval is related to the thickness of the material can be seen by considering the relation between the oscillator frequency and the time period between the leading edges of the first and the sixth pulses 21b to 21g inclusive.

A standard formula relating distance (thickness), velocity and time may be written as:

$$\frac{2nT}{V_{ss}} = t$$

where
T = thickness of material in inches.
$n$ = the number of time periods between the successive thickness echo pulses that are used; e.g., the number of time periods between 21b and 21g inclusive is 5. Since each echo pulse represents a round trip from front to back and return in the material, then $2nT$ is the total thickness the ultrasound traverses in the total time period at interest.
$V_{ss}$ = the speed of sound in the material in inches/second.
$t$ = time in seconds.

Multiplying this relation by $f_0$ yields:

$$\frac{2nTf_0}{V_{ss}} = f_0 t$$

where $f_0$ = the oscillator frequency in cycles/second.

The right-hand side of this equation represents the number of oscillations of the oscillator that can occur during the time period $t$ and thus how many counts can be stored in counter J during a single reception interval from 21b to 21g inclusive. By normal algebraic manipulation this can be rewritten as $$R = \frac{T}{f_0 t} = \frac{V_{ss}}{2nf_0}$$

where $R$ = the resolution or accuracy of counting in inches/cycle of oscillation of the oscillator and is equal to the number of successive reception intervals, each including signals 21b to 21g inclusive, that must be used to have the total count in counter J equal the decimal value of the thickness T.

Consider as a specific example the situation where the accuracy or resolution R is chosen to be 0.005" and where the $V_{ss}$ velocity of sound in steel is taken to be $23 \times 10^4$ inches/second. Then five successive reception intervals, each including pulses 21b to 21g inclusive must be used to accumulate the digital value equal to the decimal value of T. The frequency $f_0$ may be calculated for an $n$ of five to be equal to $4.6 \times 10^6$ cycles/second.

Thus, for example, for a thickness $T = 0.150$ inch, the total time $t$ for a reception interval between 21b and 21g inclusive for the velocity of sound in steel may be calculated to be approximately $6.52 \times 10^{-6}$ seconds. In that period of time, the counter J will record thirty counts and thus for five successive reception intervals will accumulate the total of 150 counts which is equal to the decimal value of the thickness for this specific example.

In practice, the oscillator frequency is varied until the displayed digital number is equal to a known thickness T. This procedure is conventionally known as a calibration procedure. It can be readily seen that a higher frequency than cited in the example may be utilized to reduce the number of successive reception intervals required to accumulate the total thickness value while increasing the accuracy of the thickness determination. In addition, different values for $n$, the number of time periods between successive thickness echoes within a single reception interval, may be chosen such that a time measure of thickness may be obtained while maintaining or increasing the accuracy of the thickness determination.

It is further apparent that the thickness determination is linear over its entire operating range for the same material, if a consistent number of thickness echoes can be maintained, as 21b to 21g inclusive from the material. This is so, since an examination of the foregoing formulae indicates that the time interval for the proper number of thickness echoes is linearly related to the thickness of the material.

The trailing edge of the second and subsequent signals 18 are caused to be entered into counter Q and to register as binary numbers 2, 3, 4, etc., one registration at the conclusion of each reception interval. During each reception interval, the aforementioned accumulating of signals 25 in counter J is cumulatively added to signals accumulated during each preceding reception interval. When Q reaches the binary 5 state, such state is electrically recognized through a multiplicity of AND gates therein (not shown) and an output signal 32 is caused to be applied to the "reset" input to bistable multivibrator R and to a fourth binary counter S, which may be considered an extension of binary counter Q. The application of signal 32 to the "reset" input to multivibrator R causes the output of R, namely, signal 20, to disappear and hence to remove one of the necessary inputs to AND gate D, thus resulting in the cessation of counting in counters K and J during the following reception intervals or until a new measuring cycle is initiated. The output signal 32 from counter Q completes the measuring cycle in that the total count stored in counter J now represents, in binary coded form, the decimal number representation of the thickness of the material.

The (K−1)st output registration of counter Q, where K may be 6, for example, is electrically recognized by a multiplicity of AND gates therein (not shown) and is applied as an output signal 33 to the input to an AND gate T. This is equivalent to the binary 5 signal 32 for this example where K equals 6. Thus, when the next, the sixth, signal 18 appears, which is also applied to an input to AND gate T, the input requirements to gate T are satisfied. Thus an output signal 34 results, which is applied as an input to an AND gate U and an AND gate V.

The total accumulation of counts in counter J, which now represents the thickness of the material, is caused to be entered, in parallel bit fashion, as a signal 35 as an input to both a digital comparator W and to a bistable multivibrator storage unit X. A digital comparator comprises a multiplicity of AND gates arranged in such a logical fashion as to compare the binary representation of one decimal number, as stored in counter J, with the binary representation of another decimal number entered in appropriate fashion into the inputs to the same AND gates. The comparison may be in terms of the equality or inequality of the two number representations. A digital comparator may be assembled from conventional modules such as the Type DC–20, DL–20, S–PAC modules manufactured by Computer Control Co. A bistable multivibrator storage unit X comprises a plurality of bistable multivibrators arranged so that the electrical state of equivalent binary number positions in binary counter J may be transferred, upon appropriate command signals, to the storage unit. This preserves the binary number representation in counter J for further use after its binary number representation is caused to be changed. A storage unit of this type may be assembled from conventional electronic modules such as the Type FA–20 S–PAC modules manufactured by Computer Control Co.

Another input to digital comparator W is a signal 36 generated by a preset digital rejector Y. A preset digital rejector as embodied in this invention comprises a set of three manual selection switches, each switch having ten positions, one position per decimal digit, wired in such a manner that the selection of any three-digit decimal number appears, electrically, as a set of twelve electrical signals, on independent, parallel wires, that are a binary representation of said three-digit decimal number. Such a rejector may be assembled from available switches of the Type TSB–P–10, binary thumbwheel switches manufactured by Chicago Dynamic Industries, Inc.

Digital comparator W continuously compares the signal 35, as entered therein in parallel bit fashion from counter J, with the minimum wall thickness rejection value as entered therein from digital rejector Y. This is done in order to determine if the measured wall thickness is less than the present minimum thickness value. The comparison appears as an output signal 37 when the measured value is less than the preset rejection value of thickness. The signal 37 is applied to an input to AND gate V. The comparison is interrogated only after the measurement is complete, that is, after the aforementioned five successive reception intervals have occurred, as indicated by signal 34. Thus, the input requirements to AND gate V are satisfied at the conclusion of each measuring cycle if the measured value of thickness as stored in counter J is less than the preselected rejection value. When this ocurs, a signal 38 results and is applied to the input to an alarm circuit Z. An alarm circuit as embodied in this invention comprises a bistable multivibrator and a senstive relay. The alarm circuit may be assembled from a bistable multivibrator as previously defined and a relay such as Type 22RJCC manufactured by Sigma Relay Co. The alarm circuit is actuated by the application of an input signal 38 and remains in the alarm signal state until reset by means (not shown). Such means may comprise an external relay or switch or an automatic signal generated from within the thickness gage or from external electronic circuitry.

Signal 32 which is applied as an input to counter S causes S to register the number of thickness readings made by the thickness gage. The counts of (L−1) and L, electrically recognized by a plurality of AND gates (not shown) and appearing as output signals 39 and 40, respectively, are arbitrarily chosen to generate a reset signal 39 to bistable multivibrator storage X, at such measurement intervals that storage X will maintain a thickness reading for a period of time consistent with the ability of an operator to observe visually the measurement stored in storage X by means X″ coupled to X. The signals 39 and 40 are applied to the inputs to storage X and AND gate U respectively. If L is arbitrarily chosen as 256, for example, and the ultrasonic testing apparatus is pulsing at a frequnecy of approximately 1,000 pulses/second, then both signals 39 and 40 will occur approximately once per 1.5 seconds. When signal 39 appears, it is applied as an input to the reset input to storage X. Thus the binary number stored in storage X and representing a particular thickness value from counter J will be destroyed and storage X will be "reset" to the binary 0 state. When signal 40 appears, it is applied as an input signal to AND gate U which also has an input signal 34. Thus when a measurement has been completed as signalled by signal 34 and when signals 34 and 40 occur simultaneously, an output signal 41 results from gate U, which is applied to a data transfer input to storage X. The input signal 41 operatively conditions a plurality of AND gates therein, (not shown), which permit the transfer to storage X, in parallel bit fashion, of the output binary number 35 stored in counter J.

The output of storage X, a signal 42, is applied as an input to a converter X′. A code converter comprises a plurality of AND gates (not shown) which convert a binary coded number representation of a quantity to a more conventional form, such as the decimal form. This is usually done in the electrical excitation of one of ten signal wires for each decimal digit. The code converter may be assembled from conventional electronic modulus such as Type OD–20 manufactured by Computer Control Co.

The code converter X′ supplies a continuous output signal 43 representing the decimal number form of the thickness value stored in storage X. This output signal 43 is applied to the input to a visual display unit X″. A visual display unit as embodied in this invention comprises circuits for acepting one signal out of ten possible signals and exciting a particular electrode in a gas-filled tube, shaped in the form of a number corresponding to the input decimal number signal. A visual display unit may be assembled from indicator tubes such as the "Nixie" type manufactured by the Burroughs Corp.

The foregoing sequence of operations relative to the alarming, digital comparison and visual readout would occur during the interval of the Kth or, in this example, the sixth gate pulse, signal 18. The trailing edge of the Kth or sixth signal 18 is caused to be entered and registered in counter Q. This count is electrically recognized by a multiplicity of AND gates therein (not shown) and is applied as an output signal 44 to the input to a monostable multivibrator R'. A monostable multivibrator comprises circuitry that generates an output signal for a fixed and selectable time interval each time its input has been excited by a proper signal and whose output signal exists for the selected time interval, independent of the existence of the input signal after the output has been initiated. A monostable multivibrator may be a Type DM-30 S-PAC module manufactured by Computer Control Co.

Output signal 45 from monostable multivibrator R' is applied as a "reset" input to counters Q and J. Thus signal 45 resets or causes both counters Q and J to assume or revert to the binary 0 (zero) state. Thus signal 30 is made to appear, as was previously assumed.

At the conclusion of signal 45, which is determined as previously explained, by the internal circuitry of the monostable multivibrator R', the thickness gage is in a complete reset or quiescent condition and prepared to begin a next measuring cycle, which will be initiated by the reappearance of signals 17 and 18, following the next burst of ultrasound sent into the material being gaged.

While the above description covers a preferred method of operation, other conditions of operation may be used without departing from the spirit of the invention. For simpler description and illustration in FIGURE 2, the selected number of reflected echoes in a reception interval was chosen as five. The number of reflected echoes that are counted in binary counter K is determined primarily by the number consistently available in a given measuring situation. It is desirable to use as many thickness echoes as possible; i.e., it is desirable to maintain the ultrasonic transducer crystal alignment and electronic sensitivity such as to maximize the number of thickness echoes. The accuracy of the gage increases directly with the number of reflection echoes that can be maintained and the speed of the gage also increases directly with the number of thickness echoes. Where equipment is available, making it possible to maintain twelve thickness echoes, the accuracy of the gage is ±0.001" and the potential speed of the gage is approximately 500 readings per second. Thus it is possible to determine thickness of materials by use of binary counter K alone.

With presently available equipment, it is difficult to maintain many more than about six such reflection echoes with the consistency necessary to have continuous gaging at the tracking or material motion speeds that it is desirable to have. With this equipment, the accuracy is about 0.003". With this equipment, where six reflection echoes are maintained in a reception interval, it is possible to indicate changes in thickness within several thousandths of an inch, from a calibrated standard thickness.

With the addition of a binary counter Q in the gage, the versatility of the gage is increased to measure a broad range of material thicknesses. With reference thereto, it is of course obvious that the above-described five predetermined number of successive input pulses and reflected echoes counted by counter Q may be changed. Usually, a number of reception intervals above five will be selected by an operator for very thick material.

The calibration procedure for the gage for any material merely requires that the operator select the number of reflection echoes that can be maintained, the number of reception intervals for scaling and then vary the oscillator frequency until the decimal number readout on visual display X" coincides with the known thickness of a material sample. It can thus be seen that an operator has three variables available to him in calibrating his gage.

Since the above-described gage was assembled to measure the thickness of material between .000" and .999", the block X" is designated as a 3-decimal visual display unit. It is of course obvious that the gage may measure thicknesses above 1". The arrangement of the gage and components thereof would be the same as described hereinabove. Changes only would be required in the units concerned with display, to include therein four decades or four decimal places. This would include counter J, comparator W, digital rejector Y, storage X, converter X' and visual display X".

As explained above, there may be a change in the selected number of reflection echoes in a reception interval and the number of reception intervals comprising input pulses and reflected echoes. There likewise may be changes in the numbers K and L used in establishing intervals of time for holding a visual display and for operating an alarm. The accumulated thickness in counter J may also be coupled to printing means to furnish a permanent thickness record at selected intervals. The output from digital comparator W may be coupled to printing means to furnish a printed indication of inequality of a standard thickness at selected intervals. A digital subtractor may be employed for comparison purposes and be coupled to a printing means to furnish a permanent record of the actual deviation from a standard thickness.

It has been explained above that consistently maintaining a number of reflection echoes in a reception interval is dependent somewhat on the speeds of the material being measured for thickness. This requires that the vertical axis of the crystal in a transducer be aligned normal to or perpendicular to the surface, for example, of a tube or a flat workpiece, where there is relative motion between the crystal and the workpiece. Such positioning is different from conventional defect testing, where the vertical axis of the crystal is maintained at some angle to the material to permit the ultrasound to traverse, for example, the wall of a tube or a flat workpiece in a horizontal direction.

Although I have disclosed herein the preferred practice and apparatus of my invention, I intend to cover as well any change or modification therein which may be made without departing from the spirit and scope of the invention.

I claim:

1. Apparatus for measuring the thickness of material capable of supporting ultrasonic waves comprising means for introducing successive pulses of ultrasonic waves through one surface of the material and delivering a signal on the arrival of each echo of a plural number of echoes from each pulse reflected from the opposite surface, means for generating a timing-frequency wave, means for accumulatively counting the number of cycles along said timing frequency wave occurring during the time spans of a predetermined number of reflected echoes resulting from a predetermined plural number of said pulses, and means responsive to said counting means for indicating a thickness measurement, said predetermined number of echoes and pulses being selected so that said means responsive to said counting means indicate directly in thickness measurement units.

2. Apparatus as defined in claim 1 including means for selecting said predetermined plural number of pulses and reflected echoes during which said number of cycles is accumulated.

3. Apparatus as defined in claim 1 in which said indicating means includes display means for the thickness measurement operable by said counting means, and means responsive to the occurrence of a successive number of pulses for repetitively connecting and disconnecting said counting means and display means.

4. Apparatus as defined in claim 1 in which said indicating means includes means for comparing the accumulated number on said counting means with a preset tolerance figure, and alarm means operable by said comparing means actuated on the occurrence of a predetermined difference therebetween.

5. Apparatus as defined in claim 1 in which said indicating means includes display means for the thickness measurement operable by said counting means, means responsive to the occurrence of a successive number of pulses for repetitively connecting and disconnecting said counting means and display means, means independent of said display means for comparing the accumulated number on said counting means with a preset tolerance figure, and alarm means operable by said comparing means actuated on the occurrence of a predetermined difference therebetween.

6. Apparatus as defined in claim 5 including means for selecting said predetermined plural number of pulses and reflected echoes during which said number of cycles is accumulated.

References Cited

UNITED STATES PATENTS

| | | | |
|---|---|---|---|
| 2,672,392 | 3/1954 | Caples et al. | 73—67.9 X |
| 2,888,824 | 6/1959 | Henry | 73—67.9 |
| 3,220,248 | 11/1965 | Wood | 73—67.7 |

FOREIGN PATENTS

| | | |
|---|---|---|
| 779,690 | 7/1957 | Great Britain. |

OTHER REFERENCES

Article entitled "Improvements in the Sing-Around Technique for Ultrasonic Velocity Measurements," by R. L. Forgacs, from the Journal of the Acoustical Society of America, vol. 32, No. 12, December 1960.

JAMES J. GILL, *Primary Examiner.*

RICHARD C. QUEISSER, *Examiner.*